Dec. 15, 1936.  T. V. BAKER  2,064,717
SAW SET
Filed Jan. 8, 1935
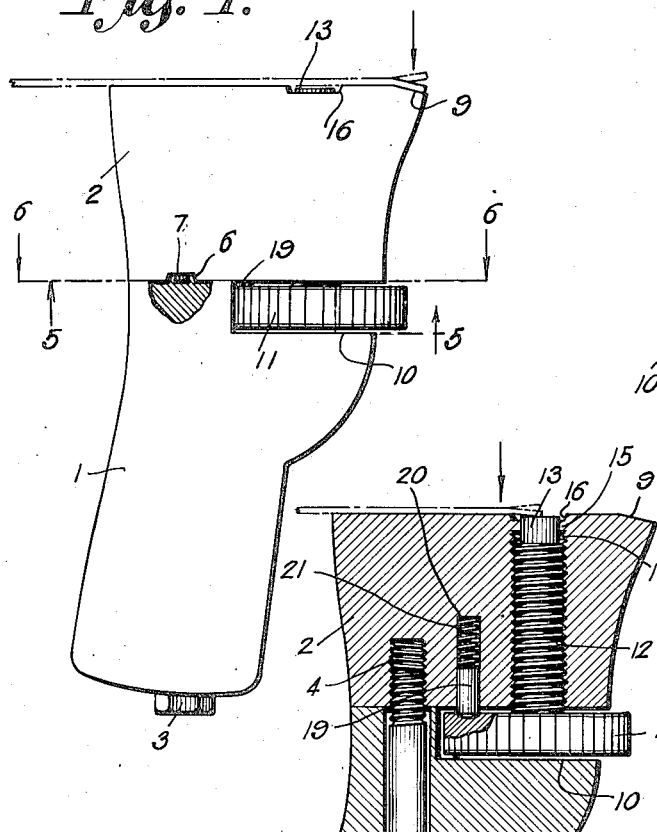
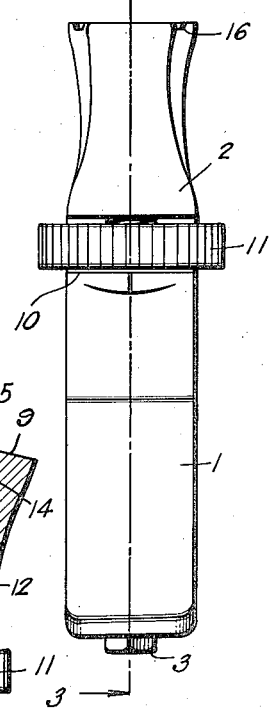
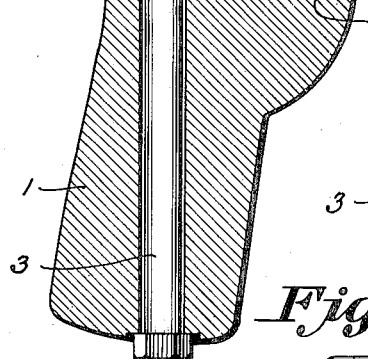
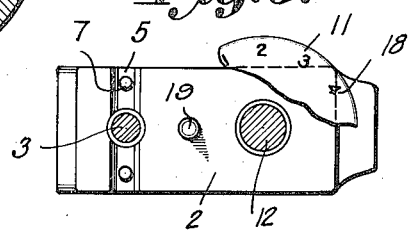
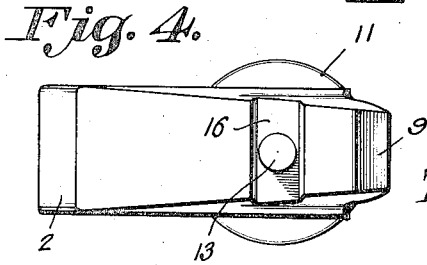
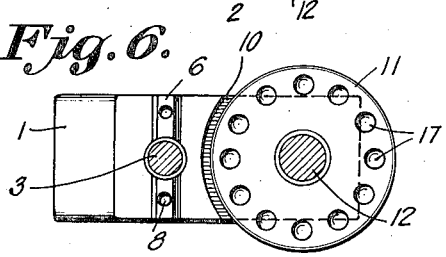
Thomas V. Baker, INVENTOR
BY Victor J. Evans & Co.
ATTORNEY

UNITED STATES PATENT OFFICE 2,064,717

SAW SET

Thomas Vester Baker, Chehalis, Wash.

Application January 8, 1935, Serial No. 901

1 Claim. (Cl. 76—73)

This invention relates to saw sets and its object is to provide a simple tool by the use of which saw teeth may be given any desired set and which, after being given a certain adjustment, will retain that adjustment until positively readjusted. With this object in view, the invention consists in a certain novel construction and combination of parts and method of operation as will be hereinafter first fully described and then more particularly defined in the appended claim.

In the annexed drawing:

Figure 1 is a side elevation, partly in section, of a saw set embodying the invention.

Figure 2 is an edge elevation thereof.

Figure 3 is a section on the line 3—3 of Figure 2.

Figure 4 is a top plan view.

Figure 5 is a section on the line 5—5 of Figure 1.

Figure 6 is a section on the line 6—6 of Figure 1.

The anvil consists of a lower section 1 and an upper section 2 which are secured together by a long bolt 3 inserted upwardly through the lower section and having its upper end engaged in an internally threaded socket 4 in the upper section. To facilitate the assembling of the sections with the socket 4 alined with the bolt hole through the lower section, a transverse groove 5 is formed across the lower end of the upper section and a corresponding rib 6 is formed across the upper end of the lower section to seat in the groove, dowels or studs 7 being provided in the groove to engage in recesses 8 in the rib. The upper end of the anvil is beveled at one edge, as shown at 9, to form a striking surface, the bevel or inclination of said surface being equal to the maximum set which is ordinarily given saw teeth.

In the upper end of the lower section is a recess 10 accommodating a milled disk or head 11 on the lower end of a threaded shank 12, the reduced upper end 13 of which constitutes a secondary anvil or striking surface. The shank 12 is engaged in a threaded bore 14 in the upper section, the upper end of the bore being separated from the upper end surface of the anvil by a web 15 through a hole in which the shank end 13 projects. A groove 16 is formed across the upper end surface of the anvil over the web 15.

In the upper face of the disk 11 are recesses or notches 17 arranged in a circular series concentric with the shank 12, and on the under side of the disk is a correspondingly disposed series of numerals, as indicated at 18 in Figure 5. A detent 19 is mounted in a socket 20 in the upper section of the anvil and is yieldingly held to the disk by a spring 21 housed in said socket. The detent engages in the notch 17 which is alined therewith and thereby holds the disk in the position in which it may be set, although it will yield when force is applied to readjust the device.

In use, the saw blade rests upon the upper end of the anvil and the alternate teeth are successively struck by a hammer so that they assume the angularity or set corresponding to the bevel of the surface 9, the blade being shifted across the anvil after each tooth is set. After half the teeth have been given this excessive set, the blade is reversed and the process is repeated to set the remaining teeth. The position of the blade is indicated by the dot and dash lines in Figure 1. The blade is then placed in the position indicated by the dot and dash lines in Figure 3, a tooth projecting over the side of the groove 16 with its point resting on the flat upper end of the auxiliary anvil 16. Hammer blows are then delivered upon the base of the tooth so that it will be brought more nearly into the plane of the blade, the excessive set being beaten out. By rotating the disk 11 until a predetermined numeral appears at the edge of the anvil, the device may be adjusted to give the saw teeth any desired final set. It will be understood that when the saw tooth with the excessive set is placed upon the secondary anvil, the blade and the base of the tooth form an angle holding the blade out of close contact with the main anvil body and hammer blows are delivered upon the base of the tooth until the blade rests flat upon the main body.

Having described my invention, what I claim is:

An anvil comprising upper and lower sections, means detachably securing the sections together, there being a recess in the upper end of the lower section, a milled disc rotatably mounted in said recess, a threaded shank integral with the disc and engaged in a threaded bore in the upper section, said shank having the upper end reduced and forming an anvil, a web in the upper end of said bore having an opening through which said reduced end of the shank projects, there being a groove formed across the upper surface of said upper section and extending across the anvil, the upper face of said disc having a plurality of notches arranged in a circular series concentric with said shank, there being a correspondingly disposed annular series of numerals on the underside of the disc designating the notches, there being a socket in said upper section, and a spring pressed detent in said socket yieldably engaged in one of said notches to hold the disc in the position in which it may be set.

THOMAS VESTER BAKER.